Patented Sept. 11, 1934

1,973,148

UNITED STATES PATENT OFFICE 1,973,148

PRODUCTS ADAPTED FOR THE PRODUCTION OF DIAZO SOLUTIONS

William E. Kemmerich, Nyack, N. Y.

No Drawing. Application February 5, 1932,
Serial No. 591,233

4 Claims. (Cl. 8—6)

My invention relates to dry preparations of great stability for making diazo-solutions, which can be used for developing colors on the fibre or for the preparation of azo-dyestuffs. Whenever a coupling compound, as for instance beta-naphthol, was to be combined with diazo-compound it was heretofore necessary to prepare a diazo-solution from an aromatic amine with the aid of a nitrite and an acid, which required skill and time and often caused difficulties for the dyer as well as unsatisfactory results.

Instead of preparing the diazo-solutions it was proposed to use stabilized diazonium-salts, or mixtures of diazonium-salts with stabilizing compounds such as aryl-sulphonic acids and their salts. Furthermore dry mixtures of an amine or an amino-salt and a nitrite were suggested together with an acid-salt, or a stabilizing acid or neutral-salt and in the latter case treatment with an acid is required to form a diazo-solution. All these preparations are, however, not absolutely stable and therefor can not be stored for a long time. The first mentioned products are not stable due to the physical nature of true diazonium-compounds, the latter are sensitive to moisture as moisture will induce diazotation and the heat of reaction will further destroy the intermediately formed labile diazonium-compound.

I have now found that dry preparations for diazo-solutions of heretofore unknown stability can be obtained, if a nitrite is combined with certain condensation products derived from an amino-compound where the amino group $NH_2$ is not present. Products of this kind, especially suitable for the preparation of diazo-solutions, or diazo-compounds, are the condensation-products obtained from an amino-compound and an aldehyde or aldehyde-bisulfite, having the following general formula:

R—N:CHX where X may be hydrogen, alkyl or aryl, and R an aromatic residue. These compounds are known to be extremely stable as such; they are insoluble or difficultly soluble in water and hydrolize only slowly. In the hydrolized state they are capable of diazotation. It is therefore evident that these compounds suspended, or dissolved, in water will diazotize in the presence of nitrous acid, or a nitrite and an acid, only very gradually, thus presenting the most favorable conditions for a perfect diazotation. In practice it has been found that the diazo-solutions so obtained are absolutely clear and do not require any filtration. The shades developed when combining them with a coupling compound are of extreme brilliancy on account of the absence of any possible decomposition product and are therefore of the highest degree of fastness. The formaldehyde, or other aldehyde, set free, acts as an after-treatment and so further improving fastness properties of the dyeings.

These preparations may be obtained in a solid and stable form by mixing together the aldehyde-amino-compound, or its bisulfite-product, with an equimolecular amount, or a small excess, of nitrite. This mixture may be used as such and brought in contact with an acid or acid-salt, in water to obtain the diazo-solution, or it may contain in addition a compound of an acid character, such for example as a bisulphate, aluminum sulphate, zinc sulphate, a naphthalene sulphonic acid, any dry organic, acid, a solid mineral acid and the like. It is often advantageous to add to the mixture a dry and indifferent diluting agent as sodium sulphate, sodium chloride, alum, or aluminum sulphate, magnesium chloride, salts of stabilizing acids, for example arylsulphonic acids, their salts, and the like. Further additions may be Turkey red oil, sulphonated naphthenic acids and their salts, mono and di-alkyl naphthalene sulphonic acids and other dyeing assistants and wetting agents.

The aldehydes employed for forming the amino-condensation products may be formaldehyde, acetaldehyde or benzaldehyde. While these aldehydes have proven to be most practical for the purpose on account of low price, other aldehydes which react in a similar way with the amines giving similar results are included.

While I have thus described my invention, I wish to be understood that many changes may be made therein without departing from the spirit thereof. The following examples explain more fully the invention, which however is not limited to these examples. The parts mentioned are by weight.

Example 1

172 parts of anhydroformaldehyde-2-5-dichloraniline, 75 parts of sodium nitrite and 253 parts of sodium sulphate are well ground together. The mixture is dissolved in a solution of 150 parts acetic acid and 200 parts of aluminum sulphate, dry, in 5000 parts of water. A clear diazo-solution is obtained at ordinary room temperature. The dry preparation is absolutely stable.

Instead of sodium sulphate, other neutral salts may be used and the quantity may be varied. The neutral salts may also be replaced with an acid salt entirely or in part. Furthermore a dry acid of inorganic or organic character can be added, and if such is present in a sufficient quantity the dry salt may be dissolved in water only to obtain the diazo-solution. Instead of the anhydroformaldehyde-2-5-dichloraniline, ethylidene-2-5-dichloraniline (obtained from acetaldehyde and 2-5-dichloraniline) may be used. Also other aldehyde-2-5-dichloraniline-condensation products may be employed.

Example 2

178 parts of ethylidene-meta-nitro-para-toluidine, 75 parts sodium nitrite, 150 parts sodium chloride and 300 parts of mono-sodium sulphate are ground together to a fine powder. There are further added 100 parts of zinc sulphate dry. The dry powder forms a clear diazo-solution when dissolved in water in 30 to 60 minutes. It was found to be unchanged after storage for nine months. If the free base meta-nitro-para-toluidine or its salts were used instead of the ethylidene-compound the preparation so obtained decomposed after 48 hours storing under the same conditions. It is recommended to add to this dry preparation, a wetting out or emulsifying agent such as a naphthalene sulfonic acid, or an alkyl-naphthalene sulfonic acid, or their salts, in order to lower the surface tension, as otherwise the dry salt will float on the surface of the water for a certain time and slow down the reaction, so that a longer time will be required to obtain the diazo-solution ready for use.

Instead of the ethylidene-compound of meta-nitro-para-toluidine the ethylidene-compounds of other similar amines may be employed for instance of para-nitro-ortho-toluidine, of meta-nitro-ortho-toluidine, of 5-chlor-ortho-toluidine, of meta-nitro-aniline, of meta-chloraniline, of ortho-chloraniline, of meta-nitro-ortho-anisidine of para-nitro-ortho-anisidine, of chloro-ortho-anisidine, of alpha-naphthylamine.

Example 3

181 parts of benzylidene-aniline are milled with 120 parts of zinc nitrite, 200 parts of aluminum sulphate, dry, and 100 parts oxalic acid. A neutral-salt like sodium chloride may also be added. After dissolving the dry preparation in lukewarm water a diazo-solution is obtained ready for use.

Example 4

190 parts of the compound $SO_3H.CH_2.HN.CH_3C_6H_3.C_6H_3.CH_3.NH.CH_2SO_3H$, obtained from ortho-toluidine and formaldehyde-bisulphite, are milled with 450 parts of the acid-sodium salt of nitrobenzene-sulfonic acid and 135 parts of anhydrous aluminum sulphate. 75 parts of sodium nitrite are then added and the dry mass is ground to a uniform fine powder. The product obtained is a very stable product even after the diazo-solution is obtained by dissolving it in water.

Example 5

206 parts of the formaldehyde-bisulphite-compound from ortho-dianisidine are mixed with 75 parts of sodium nitrite and 310 parts of the mono-sodium salt of 1-5-naphthalene disulphonic acid and 150 parts of magnesium sulphate and ground to a fine powder. When dissolved in water, a brownish clear solution is formed after 30 minutes.

Example 6

About 165 parts of anhydroformaldehyde 1-naphthylamine are mixed with 200 parts anhydrous sodium sulphate and 200 parts of ricinol-sulphonic acid. To the dry mixture, a mixture of 75 parts of sodium nitrite and 100 parts sodium chloride are added and the resulting mass is pulverized. When dissolved in water a diazo-solution is obtained ready for use.

I do not limit myself to the particular chemicals, quantities, times, temperatures or steps of procedure mentioned herein as these are given simply as a means for clearly describing my invention.

What I claim is:—

1. A dry composition suitable for the preparation of diazo-solutions consisting of a compound derived from an amine and an aldehyde, having the general formula $$R-N:CHX$$

where X may be hydrogen, alkyl or aryl and R an aromatic residue, and a nitrite in about equimolecular amounts.

2. A dry composition suitable for the preparation of diazo-solutions consisting of an anhydro-aldehyde-amino-compound of the general formula $$R-N:CHX$$

where X may be hydrogen, alkyl or aryl and R an aromatic residue, a nitrite in about equimolecular amounts and a neutral salt.

3. A dry composition suitable for the preparation for diazo-solutions consisting of an anhydro-aldehyde-amino-compound, having the general formula $$R-N:CHX$$

where X may be hydrogen, alkyl or aryl and R an aromatic residue, a nitrite in about equimolecular amounts, and a solid compound of an acid character.

4. A dry composition suitable for the preparation of diazo-solutions consisting of an anhydro-aldehyde-amino-compound having the general formula $$R-N:CHX$$

where X may be hydrogen, alkyl or aryl and R an aromatic residue, a nitrite in about equimolecular quantities, an indifferent body and a compound of an acid character.

WILLIAM E. KEMMERICH.